J. C. KING.
ANIMAL TRAP.
APPLICATION FILED JULY 28, 1908.
912,134.
Patented Feb. 9, 1909.
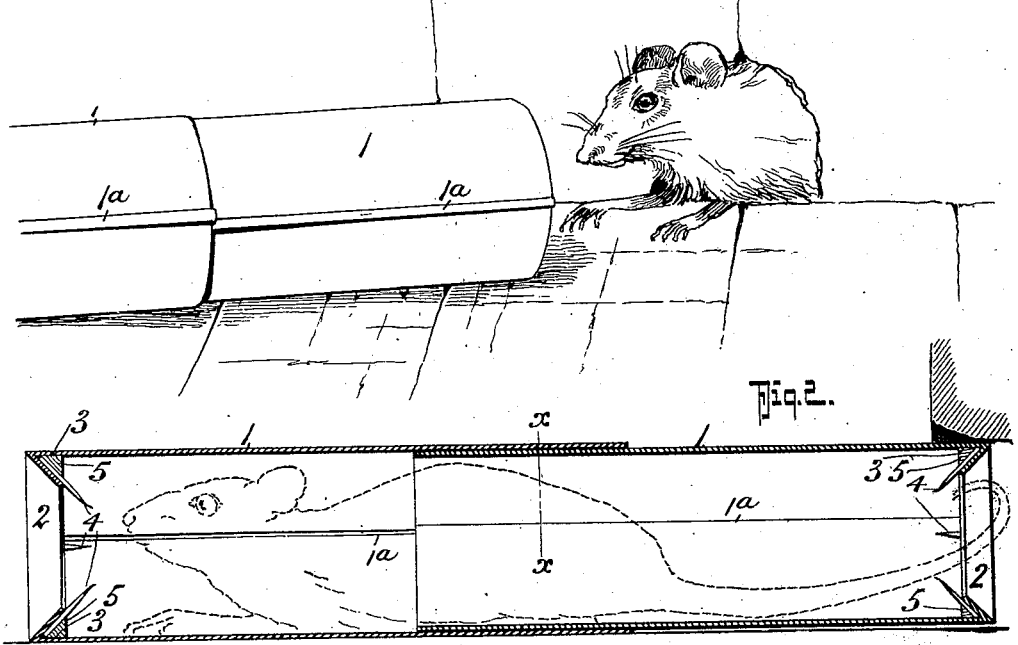
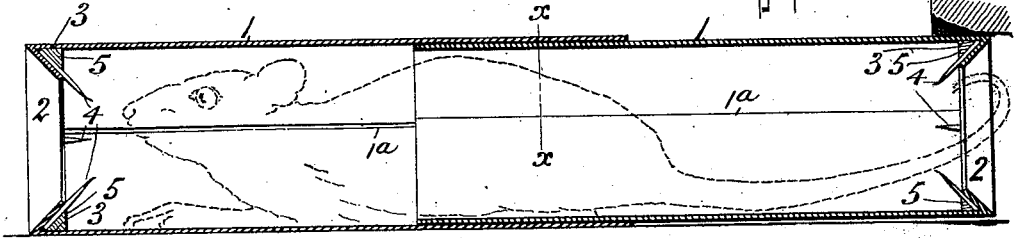
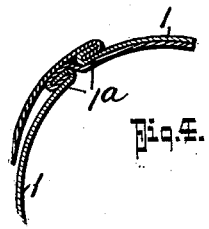
WITNESSES:
INVENTOR
JAMES C. KING.
BY
ATTORNEYS.

UNITED STATES PATENT OFFICE.

JAMES C. KING, OF HEMET, CALIFORNIA, ASSIGNOR OF ONE-HALF TO JONAS FRANKLIN, OF HEMET, CALIFORNIA.

ANIMAL-TRAP.

No. 912,134.  Specification of Letters Patent.  Patented Feb. 9, 1909.

Application filed July 28, 1908. Serial No. 445,777.

*To all whom it may concern:*

Be it known that I, JAMES C. KING, residing at Hemet, in the county of Riverside and State of California, have invented a new and Improved Animal-Trap, of which the following is a specification.

My invention, which is more especially intended for catching rats, mice and other rodents, has for its object to provide a simple, inexpensive device that can be readily placed at or within the rat hole in such a manner that the animal in passing out will enter the same in trying to get out of his hole.

My invention comprises a tube or hollow cylinder made of two like parts, that telescopically join and have means for frictionally holding together to such extent that the animal cannot separate them in trying to get out and without the necessity of using external catch or lock devices for holding the parts together.

In its more complete nature, my invention comprehends a pair of telescopic members having solid conical entrant walls at the free ends for making a smooth, but gradually tapering, inlet or way for the animal, and which forms an internal annular space for receiving solder for fixedly holding a series of barbs that project inwardly beyond the tapering way or rim.

Another and essential object of my invention is to provide a trap consisting of a two part cylinder, having spiked inlets arranged to prevent the backing out of the animal after partly entering the tube, and pushing forwardly out of the tube, formed of two half sections, slidably joined at the center and in such manner that they remain substantially interlocked against opening by moving of the rat therein, and which are relatively so formed and held together that when it is desired to feed the rat to a terrier, the trap can be gripped with absolute safety by the holder and the two members so manipulated that they can be readily separated, and in such manner as to throw the rat away from the trap holder and avoid danger of the rat biting or getting between the legs.

My invention consists in certain details of construction and peculiar combination of parts, all of which will be hereinafter fully explained, specifically pointed out in the appended claims and illustrated in the accompanying drawings, in which:—

Figure 1, is a view of my trap showing the manner in which it may be placed for use. Fig. 2, is a longitudinal section thereof, the rat being shown in dotted lines. Fig. 3, is a perspective view that illustrates the manner in which the trap may be opened for discharging the rat. Fig. 4, is a detail cross section on the line $x$—$x$ on Fig. 2.

In the practical construction, my invention comprises a tube or cylinder formed of two half sections 1—1 of thin sheet metal, preferably of sufficient resiliency to telescopically engage, and to provide for a frictional contact sufficiently tight that the two members will not separate under ordinary usage, each section is formed with a longitudinal rib 1$^a$, whereby in fitting the parts on each other, the rib of one section engages the spring portion of the other section, see Fig. 4. At the outer end, each section has a conically shaped internal flange 2 that is smooth throughout its entire circular surface, and these flanges are soldered or otherwise made fast at their outer edges to the internal face of their respective tube sections. By providing a smooth internal flange as shown, a gradually restricted entrance end and an annular internal pocket 3 is provided for each section, the purpose of which will presently appear.

4 designates yielding spikes that are located in the outer ends of each section and these extend inwardly and project a suitable distance beyond the flanges 2 and for firmly holding the said spikes to their desired position and from being easily bent back their inner or head ends are embedded in a solder closure 5 that is poured into the pockets 3.

By reason of constructing the several parts as described and shown in the drawing, it is manifest the two sections can be readily telescoped and held under a sufficient frictional contact to keep them locked together and from becoming separated under ordinary use, and by providing a smooth flange at the entrance end the spikes do not come into contact with the animal until he has partly entered, the frictional locking of the two parts doing away with the necessity of providing spring catches and the like on the outside of the tube members to hold the parts together, thereby leaving the entire outer surface of the tube smooth and so that the trap can be conveniently grasped by both hands and in such manner that they can be separated to discharge the captured rat by pulling the two members apart without danger of the hands coming in contact with the rat when thrown out.

It will be readily apparent from the drawing that the trap can be inserted with one end in the rat hole or adjacent thereto and that if desired, bait can be placed inside the trap. The rat, in entering the trap, in attempting the escape through the outer end after its head has passed between the spikes cannot back out without the spikes sticking him and hence his only movement without pain will be forwardly. After having passed into the trap, see Fig. 3, the prongs will retard his moving forwardly or backwardly.

I am aware that tube traps having spikes at their ends have been heretofore made for trapping fish or animals and I do not therefore broadly claim such features but—

What I do claim and desire to secure by Letters Patent, is:

1. An animal trap, consisting of a tube formed of two telescopic sections, each section having an inwardly projected conical flange, and a pocket back of the flange at the entrance end, a series of spikes whose head portions lie in the pocket and whose prong ends extend inwardly from the conical flange and a solder filling in the pockets, for the purposes stated.

2. As a new and improved article, an animal trap that consists of a tube formed of two like sections of sheet metal, said tubes being arranged to telescope and each having a longitudinal outwardly projected rib, a conical smooth face flange secured in the entrance end of each tube section, a series of spikes located in the receiving ends of the tubes back of the flange extended inwardly and projected beyond the inner end of the conical flanges and a prong holding filling in the receiving end of each section back of the flange, as set forth.

JAMES C. KING.

Witnesses:
A. R. ALDERMAN,
H. H. SPAULDING.